United States Patent
Wu et al.

(10) Patent No.: US 8,489,830 B2
(45) Date of Patent: Jul. 16, 2013

(54) IMPLEMENTING READ/WRITE, MULTI-VERSIONED FILE SYSTEM ON TOP OF BACKUP DATA

(75) Inventors: Weibao Wu, Vadnais Heights, MN (US); Mike Zeis, Minneapolis, MN (US); Tom Hartnett, Saint Paul, MN (US)

(73) Assignee: Symantec Corporation, Mountain View, CA (US)

(*) Notice: Subject to any disclaimer, the term of this patent is extended or adjusted under 35 U.S.C. 154(b) by 728 days.

(21) Appl. No.: 11/694,637

(22) Filed: Mar. 30, 2007

(65) Prior Publication Data
US 2008/0243953 A1 Oct. 2, 2008

(51) Int. Cl.
*G06F 12/00* (2006.01)

(52) U.S. Cl.
USPC .................................. 711/162; 711/E12.103

(58) Field of Classification Search
USPC .......................................... 711/162, E12.103
See application file for complete search history.

(56) References Cited

U.S. PATENT DOCUMENTS

| | | | |
|---|---|---|---|
| 5,812,398 A | | 9/1998 | Nielsen |
| 5,864,853 A * | | 1/1999 | Kimura et al. ........................ 1/1 |
| 6,335,742 B1 * | | 1/2002 | Takemoto ..................... 715/781 |
| 6,782,401 B2 | | 8/2004 | Winokur |
| 6,826,711 B2 | | 11/2004 | Moulton et al. |
| 6,928,526 B1 | | 8/2005 | Zhu et al. |
| 7,146,476 B2 | | 12/2006 | Sandorfi et al. |
| 7,165,082 B1 | | 1/2007 | DeVos |
| 7,200,604 B2 | | 4/2007 | Forman et al. |
| 7,251,680 B2 | | 7/2007 | DeVos |
| 7,437,387 B2 | | 10/2008 | Cohen et al. |
| 2002/0029228 A1 * | | 3/2002 | Rodriguez et al. ............ 707/204 |
| 2002/0120678 A1 | | 8/2002 | Jones et al. |
| 2003/0195887 A1 * | | 10/2003 | Vishlitzky et al. .............. 707/10 |

(Continued)

FOREIGN PATENT DOCUMENTS

| | | |
|---|---|---|
| FR | 2 873 219 | 1/2006 |
| JP | 2004326800 | 11/2004 |

(Continued)

OTHER PUBLICATIONS

International Search Report in Application No. 08103010.8-224 / 1975788 issued Aug. 3, 2012.

(Continued)

*Primary Examiner* — Larry Mackall
(74) *Attorney, Agent, or Firm* — Rory D. Rankin; Meyertons, Hood, Kivlin, Kowert & Goetzel, P.C.

(57) ABSTRACT

Various embodiments of a computer system and methods are disclosed. In one embodiment, a computer system includes hosts coupled to a backup medium. The backup medium stores data segments and objects, each object referencing one or more segments. A second host conveys a write request to a first host identifying a data entity comprising segments referenced by a first object. The first host restores a copy of the data entity and creates a second object referencing the segments that were referenced by the first object in response to receiving the write request. The first host adds segment references to the second object in response to receiving a change that adds data to the copy or deletes a portion of a segment from the copy. The first host removes a segment reference from the second object if a change deletes all of a segment from the copy.

14 Claims, 8 Drawing Sheets

U.S. PATENT DOCUMENTS

2004/0143713 A1 7/2004 Niles
2004/0210608 A1 10/2004 Lee
2005/0108486 A1 5/2005 Sandorfi
2007/0174576 A1* 7/2007 Meiri et al. .................. 711/170

FOREIGN PATENT DOCUMENTS

| | | |
|---|---|---|
| JP | 2004342050 | 12/2004 |
| JP | 2006065622 | 3/2006 |
| JP | 2007025843 | 2/2007 |

OTHER PUBLICATIONS

Office Action from Japanese Patent Application No. 2008-088515 mailed Nov. 13, 2012 pp. 1-3.

* cited by examiner

IMPLEMENTING READ/WRITE, MULTI-VERSIONED FILE SYSTEM ON TOP OF BACKUP DATA

BACKGROUND OF THE INVENTION

1. Field of the Invention

This invention relates to computer systems and, more particularly, to backup and restoration of data within computer systems.

2. Description of the Related Art

There is an increasing need for organizations to protect data that resides on a variety of client devices via some type of backup mechanism. For example, numerous client devices may be coupled to a network to which one or more media servers are also coupled. The media servers may include or be further coupled to a storage unit consisting of one or more disk storage devices, tape drives, or other backup media. A backup agent on each client device may convey data files to the media server for storage according to a variety of schedules, policies, etc. For example, large backup datasets may be moved from a client device to a media server configured to store data for later retrieval, thereby protecting data from loss due to user error, system failure, outages, and disasters, etc. as well as archiving information for regulatory compliance, workflow tracking, etc.

In order to make data more readily available, one or more metadata managers may store metadata in a catalog, the metadata describing the associated backup data. Such a catalog may be referred to as a metabase. Metadata managers may be located on separate hosts or co-located on hosts that include backup data. Accordingly, one or more metabases hosted in a variety of locations may contain data describing backup data.

Client devices may backup and restore data on conventional backup media as well as on disk-based backup media. Conventional archival storage techniques where entire datasets are stored, whether or not earlier identical versions have been stored, may be used. In other cases, single-instance storage techniques may be used in which datasets are segmented and the segments are de-duplicated. Conventional and single-instance techniques may be mixed in the same backup environment. To facilitate finding data entities that are stored in backup systems, file system user interfaces may be provided on client devices. For example, files in a backup may be read through interfaces that provide some of the capabilities of Network File System (NFS) or Common Internet File System (CIFS). Unfortunately, these interfaces do not provide the ability to write to, modify, or create multiple versions of files in a backup.

In view of the above, an effective system and method for writing and multi-versioning files in a backup stored on backup media that accounts for these issues is desired.

SUMMARY OF THE INVENTION

Various embodiments of a computer system and methods are disclosed. In one embodiment, a computer system includes a first host coupled to a backup medium and a second host. The backup medium is configured to store data segments and data objects, each data object referencing one or more of the data segments. The second host is configured to convey a write request to the first host identifying a data entity, wherein the data entity comprises data segments referenced by a first data object. The first host is configured to restore a copy of the data entity and create a second data object referencing the data segments that were referenced by the first data object in response to receiving the write request. The second host is further configured to make modifications to the copy, and convey data changes to the first host corresponding to the modifications. The first host is further configured to add one or more data segment references to the second data object in response to receiving a data change that adds data to the copy or deletes a portion of a data segment from the copy. The first host is further configured to remove a data segment reference from the second data object if a data change deletes all of a data segment from the copy. In one embodiment, the backup medium comprises single instance backup data.

In a further embodiment, the computer system includes a catalog configured to store metadata describing the plurality of backup data objects. In a still further embodiment, the host is configured to access the backup medium through a virtual file system interface. The virtual file system interface is configured to enable the second host to write data objects to the backup medium. The virtual file system interface may be further configured to enable the second host to create and store multiple versions of backup data objects on the backup medium. The catalog may be further configured to store metadata describing branches containing multiple version of the plurality of backup data objects.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
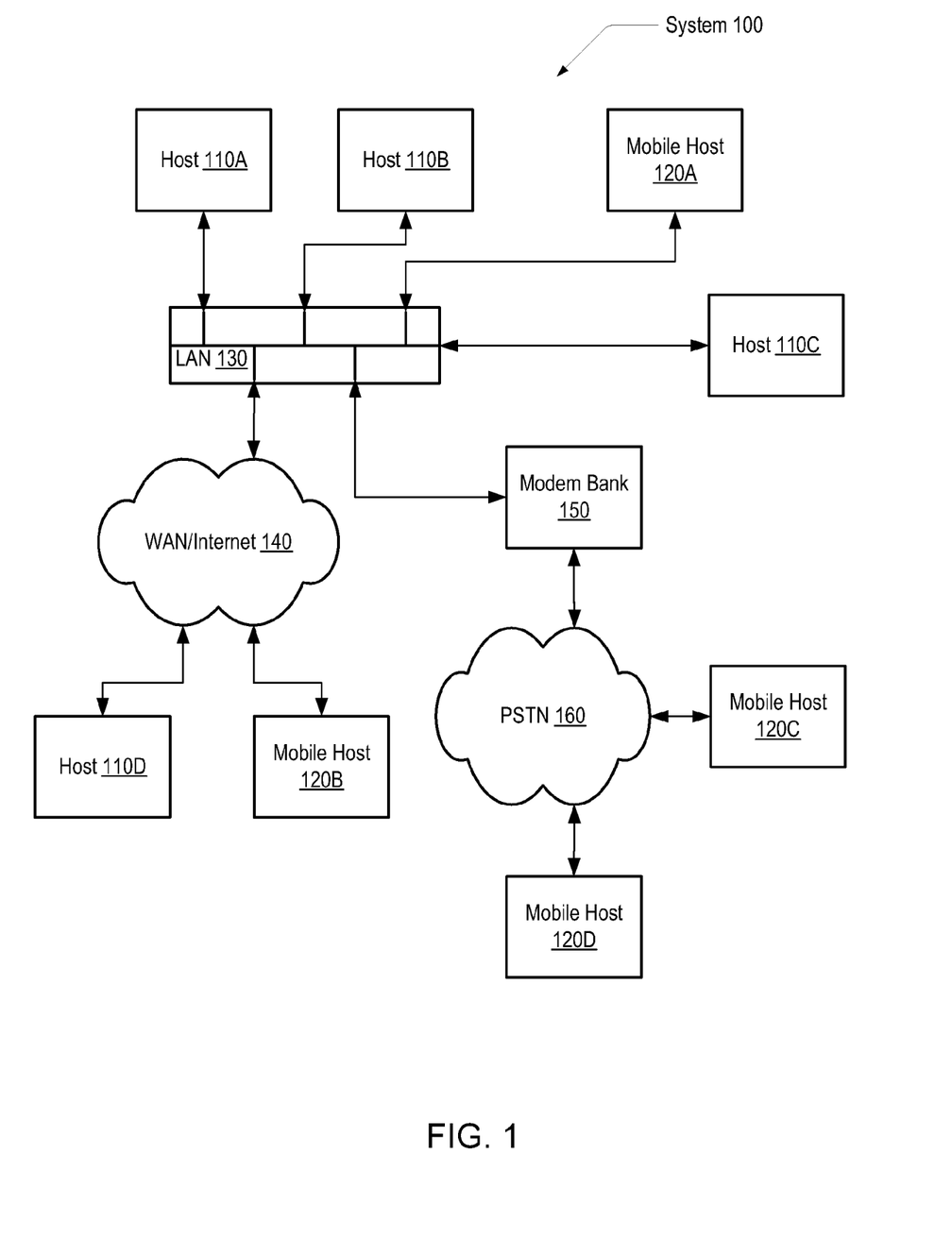
FIG. 1 illustrates one embodiment of a computer system.

FIG. 1 illustrates one embodiment of a computer system 100. As shown, system 100 includes hosts 110A-110D and mobile hosts 120A-120D interconnected through a network that includes a local area network (LAN) 130 coupled to a wide area network WAN/Internet 140 and a modem bank 150, which is in turn coupled to a public switched telephone network (PSTN) 160. Hosts 110A-110D are representative of any number of stationary computers. Mobile hosts 120A-

120D are representative of any number of mobile client computing devices such as laptops, handheld computers, etc. Both hosts and mobile hosts may operate as peers in a peer-to-peer configuration or as clients and servers in a client/server configuration.

In alternative embodiments, the number and type of hosts, LANs, WANs, and modem banks is not limited to those shown in FIG. 1. Almost any number and combination of server, desktop, and mobile hosts may be interconnected in system 100 via various combinations of modem banks, direct LAN connections, wireless connections, WAN links, etc. Also, at various times one or more hosts may operate offline. In addition, during operation, individual host connection types may change as mobile users travel from place to place connecting, disconnecting, and reconnecting to system 100.

Figure 2:
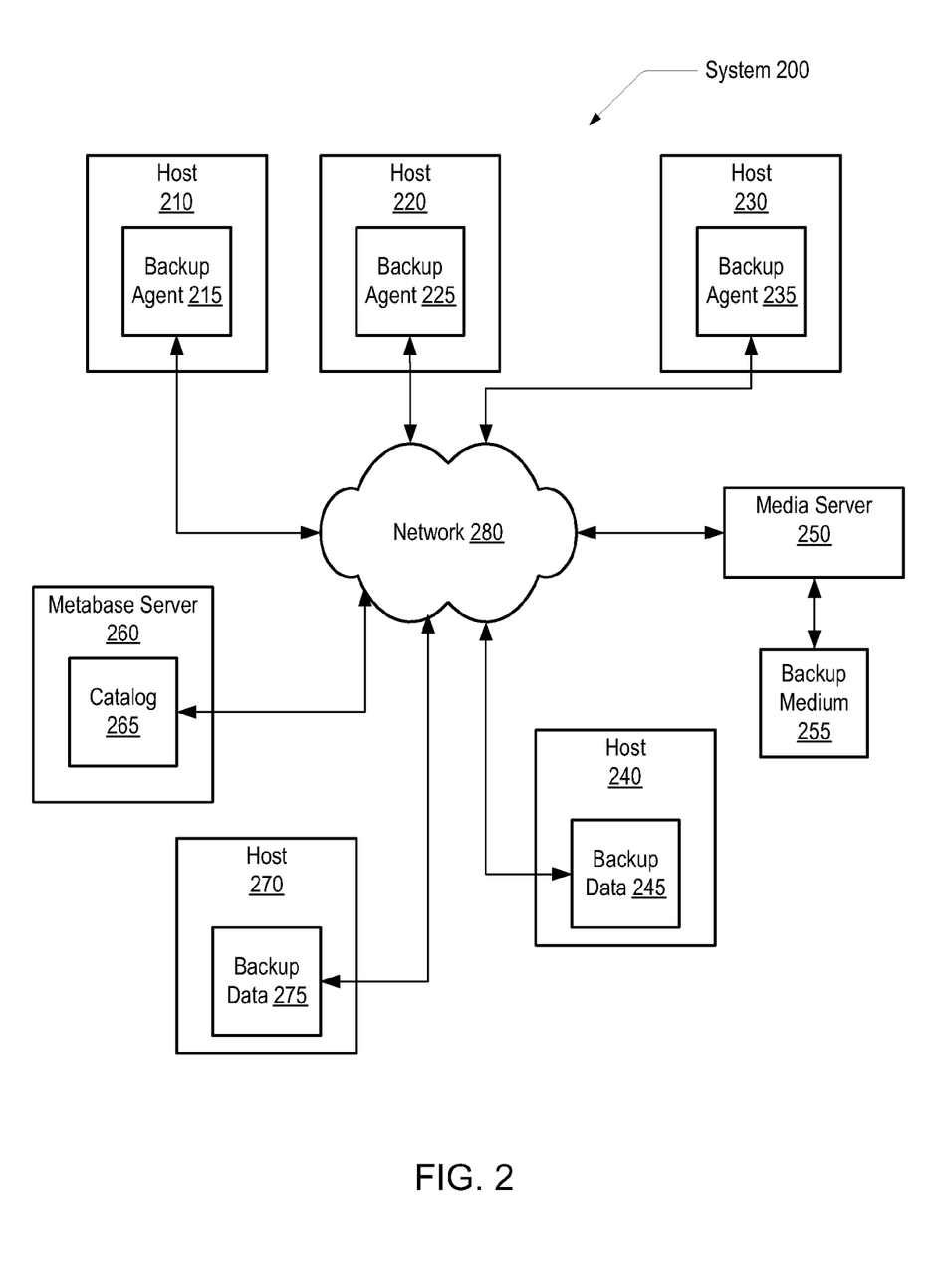
FIG. 2 is a generalized block diagram of one embodiment of a backup system that may operate within a computer system.

Within system 100, it may be desired to protect data associated with any of hosts 110A-110D and mobile hosts 120A-120D. In order to protect host-associated data, various backup components may operate on hosts 110A-110D and mobile hosts 120A-120D. Turning now to FIG. 2, a generalized block diagram of one embodiment of a backup system 200 that may operate within system 100 is shown. System 200 includes hosts 210, 220, 230, 240, and 270 coupled through network 280 to a media server 250 and a metabase server 260. Backup agents 215, 225, and 235 operate on hosts 210, 220, and 230, respectively. In the illustrated embodiment, media server 250 is further coupled to a storage pool 255 in which a copy of data from one or more hosts may be stored. In one embodiment, storage pool 255 may be part of or included in backup server 250. Hosts 240 and 270 may include backup data 245 and backup data 275 respectively, in which a copy of data from one or more hosts may be also be stored. In one embodiment, backup data 245 and/or 275 may be single-instance storage pools. Metabase server 260 includes a catalog 265 on which may be stored metadata describing the data stored in backup data 245 and 275 and in backup medium 255. Additional metabases may be included in system 200 in alternative embodiments. Additional backup data may also be included in system 200, depending on the storage requirements of the system.

During operation, backup agents 215, 225, and 235 may perform data backups. For example, in one embodiment data may be conveyed to one or more backup data locations and associated metadata conveyed to one or more metabases. Backup frequency may depend on a variety of factors including the urgency of data protection, storage pool capacity, network connection state, and enterprise policies. In one embodiment, backups may be done according to a schedule or at other times determined by administrative policy, security policy, or to meet other requirements of an enterprise.

In order to minimize the size of backup data, single-instance storage techniques may be employed. In a single-instance storage pool, data is stored in segments, with each segment having an identifier or fingerprint that may be used to unambiguously identify it. For example, a data file may be segmented, and a fingerprint calculated for each segment. Duplicate copies of data segments are replaced by a single instance of the segment and a set of references to the segment, one for each copy. To retrieve a backup file, a set of fingerprints corresponding to the file's segments may be used as keys to locate the desired segments. Once the segments have been retrieved, they may be used to re-assemble the desired file.

Figure 3:
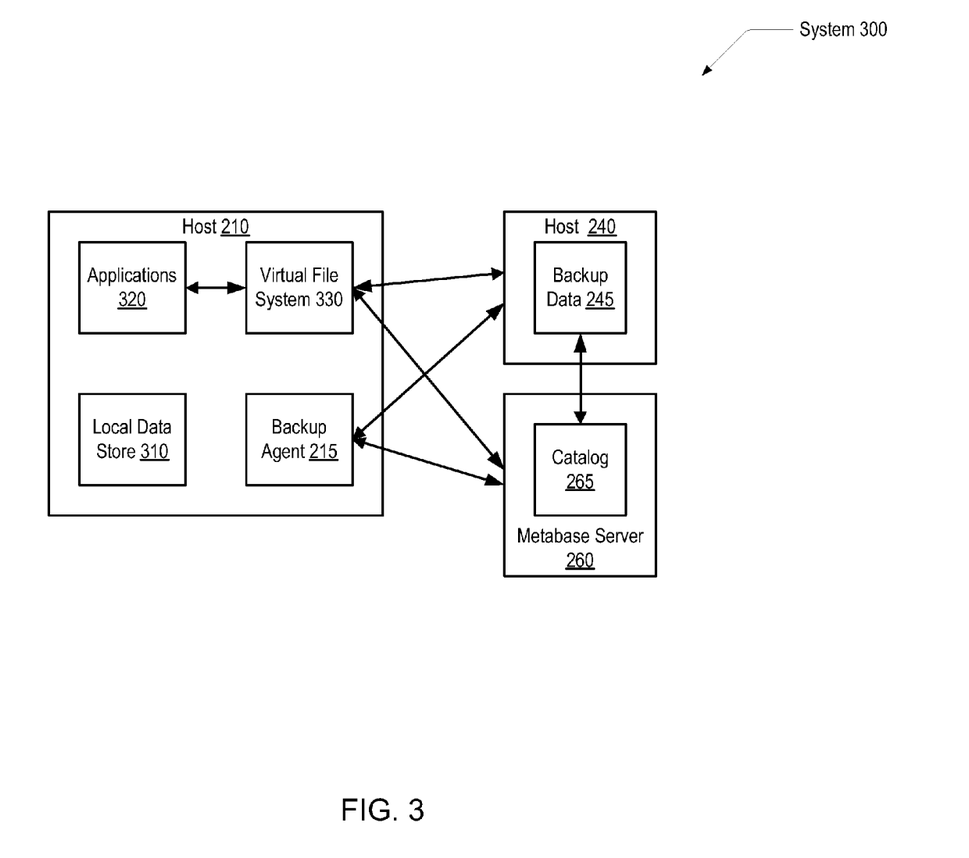
FIG. 3 is a more detailed block diagram of one embodiment of a system that may be a portion of a backup system.

FIG. 3 is a more detailed block diagram of one embodiment of a system 300 that may be a portion of system 200. System 300 includes hosts 210 and 240 and metabase server 260. Host 210 includes a local data store 310, applications 320, a virtual file system 330, and a backup agent 215. Host 240 includes backup data 245. Metabase server 260 includes a catalog 265 in which metadata describing the data stored in backup data 245 may be stored. Applications 320 may be any of a variety of conventional applications such as word processing programs, spreadsheets, browsers, etc. Backup agent 215 may backup data from local data store 310 by sending data directly to backup data 245 and associated metadata to catalog 265 using conventional backup techniques. Backup agent 215 may restore data to local data store 310 by retrieving data directly from backup data 245 and associated metadata from catalog 265 using conventional restoration techniques. In addition, applications 320 may perform read and write operations on backup data through an interface provided by virtual file system 330. In one embodiment, virtual file system 330 may provide a CIFS/NFS interface. A variety of alternative interfaces may be provided such as a WebDav interface, pseudo devices interface, etc. To read backup data, virtual file system 330 may present a view of catalog 265, allowing a user or an application to select data files for retrieval, retrieve the files from storage pool 245, and store the retrieved files in local data store 310. Virtual file system 330 may allow a user or an application to write backup data, including writing multiple versions of data files, as though writing to a conventional file system. Before describing the processes through which these actions may be performed, a description of the organization of data and metadata stored in backup data 245 and catalog 265 will first be given.

Figure 4:
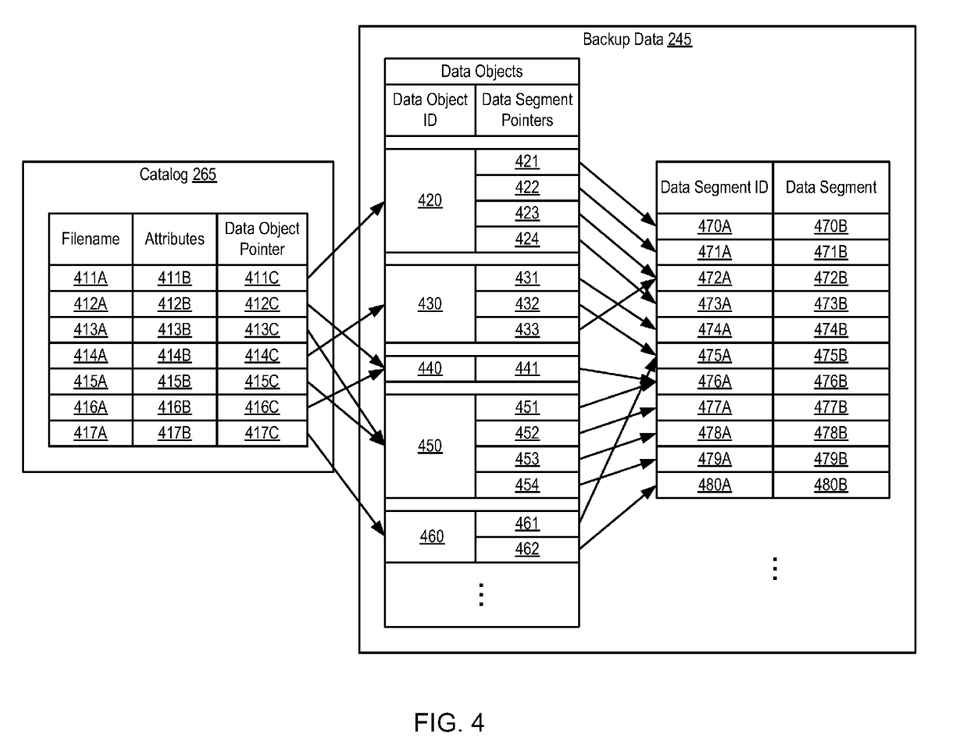
FIG. 4 illustrates one embodiment of a catalog and its associated data in a storage pool.

Turning now to FIG. 4, one embodiment of catalog 265 and its associated data in backup data 245 is shown. Catalog 265 may include a database, tables, or other similar data structures. In the illustrated embodiment, catalog 265 includes a table of entries. Each entry includes a filename, a set of attributes, and a data object pointer. More specifically, a first entry includes filename 411A, attributes 411B, and data object pointer 411C, and may be referred to hereinafter as entry 411. Similar filenames, attributes, and data object pointers are shown for entries 412-417.

A file, as used herein, may comprise one or more files or other data structures. In one embodiment, filenames such as filename 411A may consist of a user-readable string. However, since multiple files may have the same name, a data object pointer is also stored in each entry to be used as a key to find a corresponding data object in backup data 245. In one embodiment, each data object pointer may be an unambiguous identifier such as a fingerprint. A fingerprint, as used herein, refers to a function of a data entity such as a hash function. In one embodiment, the fingerprints may be encrypted. More particularly, a fingerprint may comprise a Message-Digest algorithm 5 (MD5) or other hash function. Alternative hash functions include Secure Hash Algorithm (SHA), a checksum, signature data, and any other suitable function, cryptographic, or otherwise, for identifying a data entity. Copies of data entities such as files or file segments may be identified by comparing a fingerprint of one entity to the fingerprint of another entity. If the fingerprints match, then the two entities are copies of each other. In addition to the filename and data object pointer, additional attributes such as attributes 411B may be included in a file's metadata. Attributes may include a variety of information describing the associated data such as one or more of: a data size, batch number, type, version number, ownership, permissions, creation time, error code, etc. Other forms of metadata and/or identifiers will be apparent to those of ordinary skill in the art.

In the illustrated embodiment, backup data 245 includes a data object table and a set of data segments. The data object table includes entries, each of which includes a data object ID and a set of associated data segment pointers. More specifically, a first entry includes data object ID 420 and data segment pointers 421-424. Additional entries having data object IDs 430, 440, 450, and 460 are shown. Data object ID 430 is associated with data segment pointers 431-433, data object ID 440 is associated with data segment pointer 441, data object ID 450 is associated with data segment pointers 451-454, and data object ID 460 is associated with data segment pointers 461-462. In one embodiment, each data object ID may be an unambiguous identifier such as a fingerprint. In a further embodiment, each data segment pointer may be an unambiguous identifier such as a fingerprint. Backup data 245 also includes data segments and associated data segment IDs. For example, data segment ID 470A is associated with data segment 470B, 471A with 471B, etc. In one embodiment, each data segment ID may be an unambiguous identifier such as a fingerprint. In a further embodiment, backup data 245 may include single-instance data objects and single-instance data segments, i.e., both data objects and data segments may be de-duplicated.

The relationships among the data object pointers of catalog 265 and the data object IDs, the data segment pointers, and the data segment IDs of backup data 245 may be arranged to permit files and their data segments to be identified, read, written and versioned. More specifically, as shown via connecting arrows in FIG. 4, data object pointer 411C points to data object ID 420, 412C and 416C point to data object ID 440, 413C and 415C point to data object ID 450, 414C points to data object ID 430, and 417C points to data object ID 460. In addition, data segment pointer 421 points to data segment ID 470A, data segment pointer 422 points to data segment ID 471A, data segment pointers 423 and 433 point to data segment ID 472A, etc. Having described the structure and organization of one embodiment of a catalog and a backup data storing data for a backup agent, attention will now turn to reading, writing, and versioning backup data files.

Figure 5:
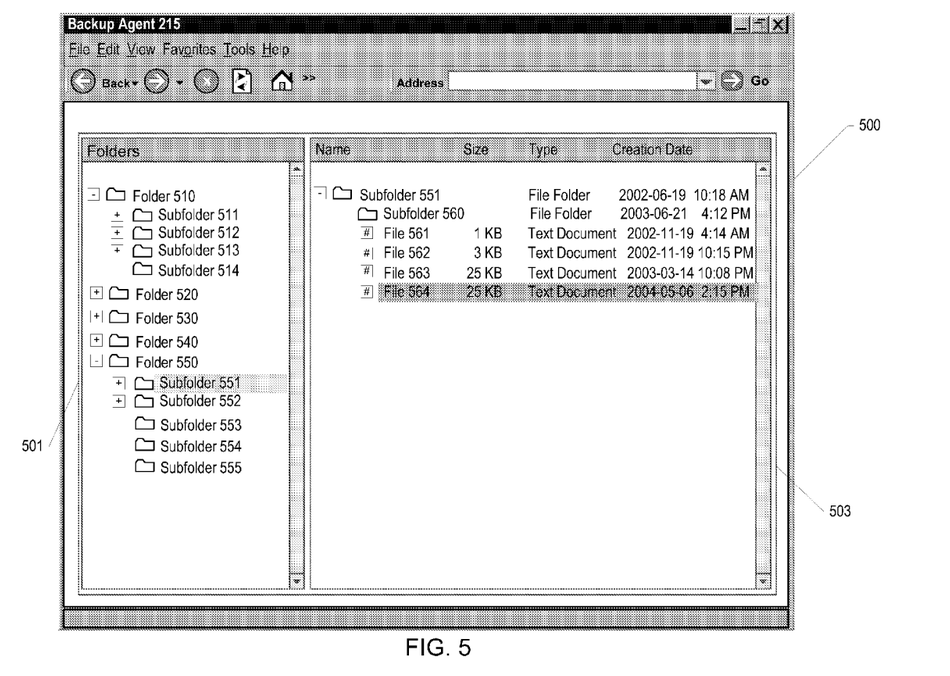
FIG. 5 illustrates one embodiment of a user interface that may be used by backup agent to view backup data and metadata.

FIG. 5 illustrates one embodiment of a user interface 500 that may be used by backup agent 215 to view backup data and metadata. Interface 500 may include features such as drop-down menus, a navigation bar, an address field, and so on. Within the interface 500 are shown two panes, a Folders pane 501 and a Details pane 503. Within the Folders pane, a hierarchy of folders and their associated subfolders may be seen and navigated. The illustrated hierarchy includes folders 510, 520, 530, 540, and 550. Each folder may include one or more sub-folders. For example, folder 510 includes subfolders 511-514 and folder 550 includes subfolders 551-555. As illustrated in FIG. 5, subfolder 551 has been selected as indicated by its highlighted background.

In the Details pane 503, details of the portion of the hierarchy selected in the Folders pane 501 may be listed in rows. Each row may include fields for Name, Size, Type, and Creation date for a particular data entity. For example, subfolder 551 is listed with a Type of "File Folder" and a Creation date of "2002-06-19 10:18 AM." Subfolder 551 includes a subfolder 560, which includes files 561-564. File 564 has been selected as indicated by its highlighted background. It is noted that the naming conventions depicted in FIG. 5 (e.g., "Subfolder 551", "File 564") are provided for ease of discussion. In a typical embodiment, names reflective of those used in ordinary business or other environments (e.g., Accounting, Payroll) may be used.

When a desired data entity is selected in the Folders pane 501, backup agent 215 may send a query to catalog 265 to retrieve the names and attributes of each folder and its included files that are part of the data entity. Conventional file manipulation techniques may be used with data entities within interface 500, such as drag-and-drop, right-click to open a list of actions, etc. A read operation may be performed when a data entity is selected. A write operation may be performed on a selected data entity through a right-click menu, a drag-and-drop action, from a pull-down menu, etc. When a write operation creates a new data entity such as during backup of a newly created folder, backup agent 215 may add an entry to catalog 265 and corresponding data to backup data 245. However, when a write operation modifies a data entity that is already present in catalog 265, such as during backup of a file within an existing folder or revision of an existing file, a different process that will be described with reference to FIG. 6 may be followed.

Figure 6:
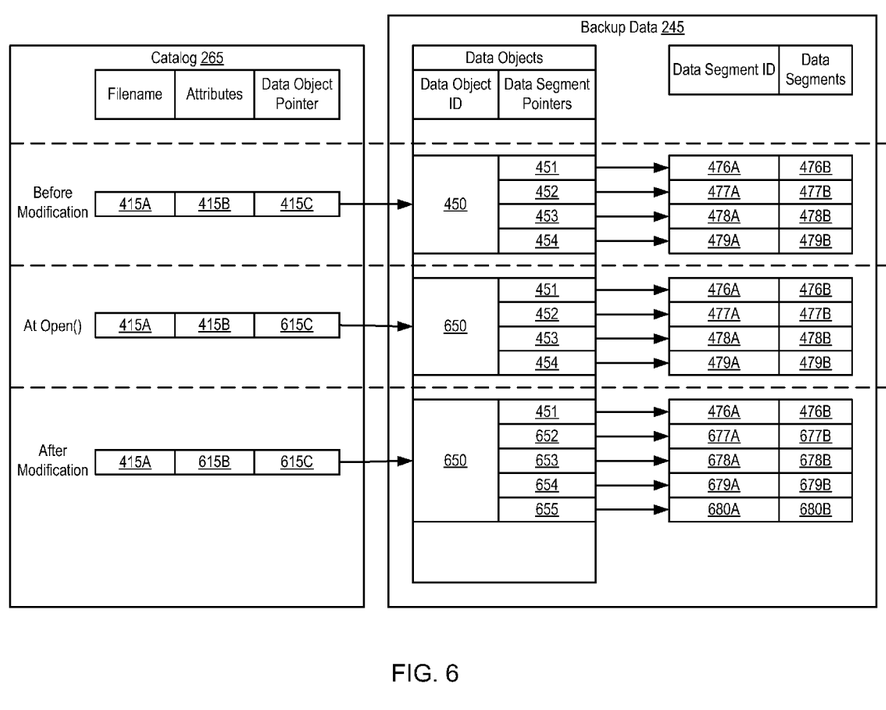
FIG. 6 illustrates one embodiment of modifications made during a write operation to data and metadata corresponding to a data entity that is stored in backup storage pool.

FIG. 6 illustrates one embodiment of modifications made during a write operation to data and metadata corresponding to a data entity that is stored in backup data 245. In the illustrated embodiment, entry 415 within catalog 265 corresponds to the data entity to be modified. Entry 415 may generally correspond to the entry 415 described in FIG. 4. Prior to the start of the write operation, depicted by the portion of FIG. 6 labeled "Before Modification," entry 415 includes a data object pointer 415C that points to a data object 450 in backup data 245. Data object 450 is associated with data segment pointers 451-454, which point to the data segment IDs of data segments 476-479. When a write operation begins, as shown in the portion of FIG. 6 labeled "At Open( )," a new catalog entry may be created. The new entry's filename and attributes may remain the same, 415A and 415B. However, the new entry may be created with a new data object pointer 615C pointing to a new data object 650 that is created in backup data 245. In one embodiment, the new data object 650 may represent a revised version of the data object 450. The new data object 650 may initially receive the same data segment pointers 451-454 associated with data object ID 450. In addition to creating the new data object, the data entity may be restored in order to be open for editing. During the write operation, data segment pointers may be added to and/or removed from the new data object as the data entity is edited. Any portion of the data entity that is deleted may cause one or more corresponding data segment pointers to be removed. Any portion of the data entity that is added may cause one or more corresponding data segment pointers to be added. Existing data segments which are modified may cause corresponding data segment pointers to be replaced by pointers to new data segments which reflect the revisions.

For example, as shown in the portion of FIG. 6 labeled "After Modification," data segment pointers 452-454 have been removed and data segment pointers 652-655 have been added. Data segment pointers 652-655 point to data segments whose IDs are 677A-680A, respectively. Backup agent 215 also sends data segment 677B-680B to backup data 245. Note that data segments 477B-479B are not removed from backup data 245 since they are still pointed to by at least data segment pointers 452-454 associated with data object ID 450. By keeping these data segments in the backup data, an earlier version of the data entity may be preserved, read, and revised further. If backup data 245 is not single-instance backup data, data segment pointers such as pointer 451 may be replaced with new data segment pointers and copies of corresponding data segments stored in backup data 245. In addition, once the write operation is completed, the restored data entity may be sent to backup data 245 and attributes 415B may be replaced with a new set of attributes 615B. For example, the new attributes 615B may include a new timestamp.

Figure 7:
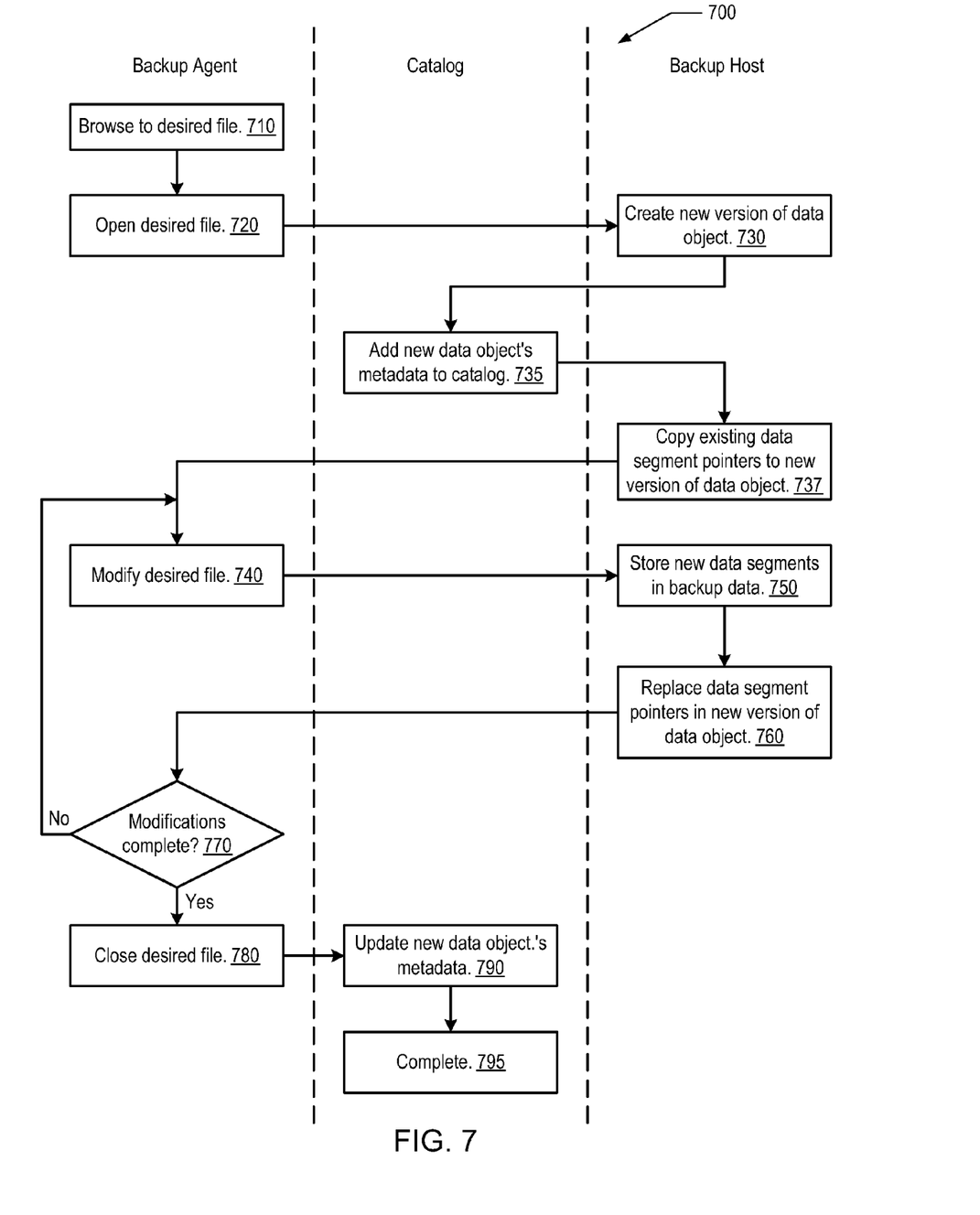
FIG. 7 illustrates one embodiment of a process for modifying a file in a backup storage pool.

FIG. 7 illustrates one embodiment of a process 700 for modifying a file within backup data. Process 700 may begin with the identification of a desired file, such as through a browser (block 710). Once a desired file has been identified, it may be opened (block 720) or otherwise made available for access. For example, a copy of the file may be restored from backup data. When a file is opened, a new version of a corresponding data object may be created in the data object table of the backup data where the identified file's data segments are stored (block 730) and an associated metadata entry may be added to the catalog (block 735). The data segment pointers that are associated with the file's data object may be added to the new data object in the backup data's data object table (737). The file may then be modified (block 740). Any new data segments that result from the modification of the file may be stored in the backup data (block 750). Data segment pointers corresponding to the new data segments may be added to and data segment pointers corresponding to portions of the file that are deleted may be removed from the new data object (block 760). The file may remain open and blocks 740, 750, and 760 repeated until modifications are complete (decision block 770). For example, the file may remain open during an editing session. Once modifications are complete, the file may be closed (block 780). When the file is closed, the metadata associated with the new data object may be updated in the catalog (block 790), completing process 700 (block 795).

Figure 8:
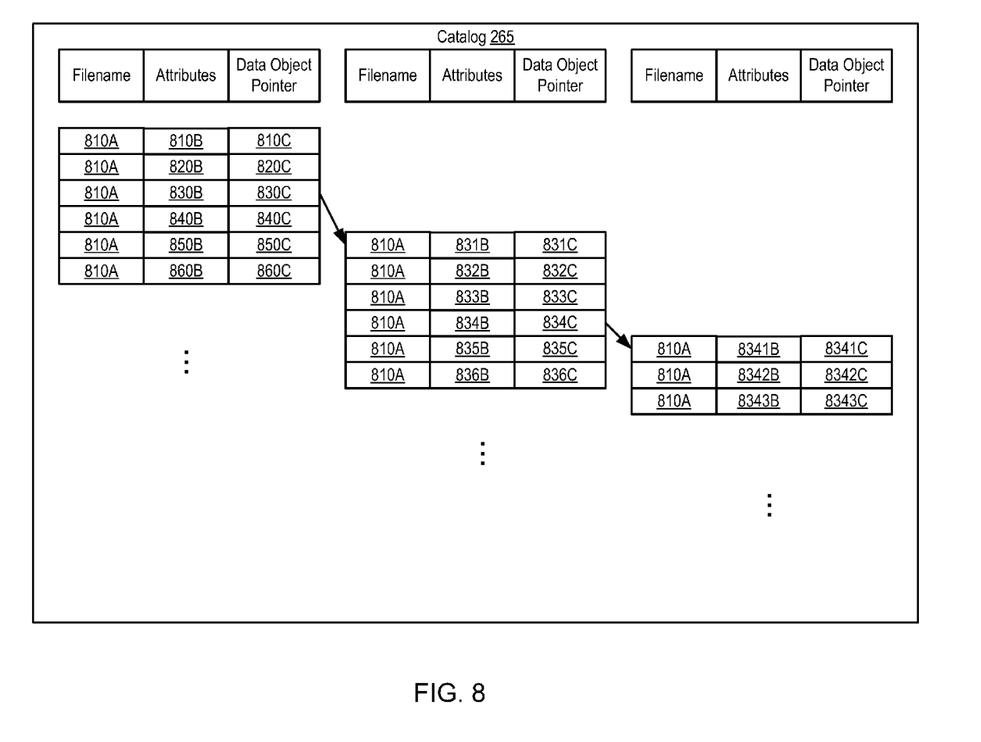
FIG. 8 illustrates one embodiment of catalog metadata corresponding to multiple version of a file.

FIG. 8 illustrates one embodiment of catalog metadata corresponding to multiple versions of a file. In the illustrated embodiment, catalog 265 includes entries corresponding to multiple branches and versions of a file with a filename of 810A. Initially, as shown at the upper left portion of FIG. 8, filename 810 A is associated with attributes 810B and data object pointer 810C. Each time the corresponding file is modified, its metadata may change. For example, on the left column of FIG. 8, filename 810A is successively associated with attributes 820B and data object pointer 820C, 830B and data object pointer 830C, 840B and data object pointer 840C, 850B and data object pointer 850C, and 860B and data object pointer 860C. The left column of FIG. 8 may correspond to a first branch of the file. A second branch of the file is shown in the center column and a third branch of the file is shown in the right column of FIG. 8. The second branch may be created from the version of the file whose metadata includes data object pointer 830C as indicated by a connecting arrow. In the second branch, the file may be further modified as indicated by the successive association of filename 810 with attributes 831B and data object pointer 831C, 832B and data object pointer 832C, 833B and data object pointer 833C, 834B and data object pointer 834C, 835B and data object pointer 835C, and 836B and data object pointer 836C. Similarly, the third branch may be created from the version of the file whose metadata includes data object pointer 834C as indicated by a connecting arrow. In the third branch, the file may be further modified as indicated by the successive association of filename 810 with attributes 8341B and data object pointer 8341C, 8342B and data object pointer 8342C, and 8343B and data object pointer 8343C, etc. Similar versioning and branching may be performed for any of the data objects associated with a file, as will be apparent to one of ordinary skill in the art.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a first host configured to store a plurality of backed up files on a backup medium, each file of the plurality of backed up files comprising one or more of a plurality of data segments, wherein in said storing the plurality of backed up files the first host is configured to:
store the plurality of data segments on the backup medium; and
for each respective file of the plurality of backed up files, store on the backup medium a respective data object that references the one or more data segments of the respective file;
a backup catalog configured to store metadata describing the plurality of backed up files, wherein the metadata includes a separate entry for each of the backed up files, and wherein the entry for each respective file includes a filename that corresponds to the respective file and a pointer to the respective data object that references the one or more data segments of the respective file; and
a second host coupled to the first host via a network, wherein the second host comprises a virtual file system interface to the backup medium, and wherein the second host is configured to convey to the first host, via the virtual file system interface, a request to open a first backed up file of the plurality of backed up files;
wherein in response to receiving the request to open the first backed up file, the first host is configured to:
create a new data object on the backup medium corresponding to a new version of the first backed up file;
add pointers to the new data object to reference the one or more data segments of the first backed up file; and
add a new entry to the backup catalog that identifies the new version of the first backed up file, wherein the new entry includes a pointer to the new data object;
wherein the second host is further configured to: after said conveying the request to open the first backed up file, convey to the first host, via the virtual file system interface, one or more modification requests to modify the first backed up file;
wherein in response to receiving the one or more modification requests, the first host is configured to:
store one or more new data segments on the backup medium; and
modify the new data object to reference the one or more new data segments, wherein in said modifying the new data object the first host is configured to perform one or more of: add one or more new pointers to the new data object to reference the one or more new data segments; or remove one or more of the previously existing pointers from the new data object.

2. The system as recited in claim 1, wherein the first host is configured to utilize a single-instance storage technique whereby data is de-duplicated to remove redundant copies on the backup medium.

3. The system as recited in claim 1, wherein the virtual file system interface is configured to enable the second host to create and store multiple versions of the backed up files on the backup medium.

4. The system as recited in claim 3, wherein the catalog is further configured to store metadata describing branches containing multiple versions of the plurality of backed up files.

5. The system as recited in claim 1,
wherein the second host is further configured to: after said conveying the one or more modification requests, convey to the first host, via the virtual file system interface, a request to close the first file;
wherein in response to receiving the request to close the first file, the first host is configured to update one or more attributes stored in the new entry that was added to the backup catalog.

6. A method for accessing backup data, the method comprising:
storing a plurality of backed up files on a backup medium coupled to a first host, each file of the plurality of files comprising one or more of a plurality of data segments, wherein said storing the plurality of backed up files includes:
storing the plurality of data segments on the backup medium; and
for each respective file of the plurality of backed up files, storing on the backup medium a respective data object that references the one or more data segments of the respective file;
storing a backup catalog including metadata describing the plurality of backed up files, wherein the metadata includes a separate entry for each of the backed up files, and wherein the entry for each respective file includes a filename that corresponds to the respective file and a pointer to the respective data object that references the one or more data segments of the respective file;
providing a virtual file system interface on a second host to access the backup medium;
conveying from the second host to the first host, via the virtual file system interface, a request to open a first backed up file of the plurality of backed up files;
in response to the first host receiving the request to open the first backed up file:
creating a new data object on the backup medium corresponding to a new version of the first backed up file;
adding pointers to the new data object to reference the one or more data segments of the first backed up file; and
adding a new entry to the backup catalog that identifies the new version of the first backed up file, wherein the new entry includes a pointer to the new data object;
after said conveying the one or more modification requests, conveying from the second host to the first host, via the virtual file system interface, one or more modification requests to modify the first backed up file;
in response to the first host receiving the one or more modification requests:
storing one or more new data segments on the backup medium; and
modifying the new data object to reference the one or more new data segments, wherein said modifying the new data object includes one or more of: adding one or more new pointers to the new data object to reference the one or more new data segments; or removing one or more of the previously existing pointers from the new data object.

7. The method as recited in claim 6, further comprising utilizing a single-instance storage technique on the backup medium whereby data is de-duplicated to remove redundant copies.

8. The system as recited in claim 6, further comprising creating and storing multiple versions of the backed up files on the backup medium through the virtual file system.

9. The method as recited in claim 8, further comprising storing metadata describing branches containing multiple versions of the plurality of the backed up files in the catalog.

10. The method as recited in claim 6, further comprising:
after said conveying the one or more modification requests, conveying from the second host to the first host, via the virtual file system interface, a request to close the first file;
in response to the first host receiving the request to close the first file, updating one or more attributes stored in the new entry that was added to the backup catalog.

11. A plurality of non-transitory computer readable media storing computer instructions that are executable by one or more processors to:
store a plurality of backed up files on a backup medium coupled to a first host, each file of the plurality of files comprising one or more of a plurality of data segments, wherein said storing the plurality of backed up files includes:
storing the plurality of data segments on the backup medium; and
for each respective file of the plurality of backed up files, storing on the backup medium a respective data object that references the one or more data segments of the respective file;
store a backup catalog including metadata describing the plurality of backed up files, wherein the metadata includes a separate entry for each of the backed up files, and wherein the entry for each respective file includes a filename that corresponds to the respective file and a pointer to the respective data object that references the one or more data segments of the respective file;
provide a virtual file system interface on a second host to access the backup medium;
convey from the second host to the first host, via the virtual file system interface, a request to open a first backed up file of the plurality of backed up files;
in response to the first host receiving the request to open the first backed up file:
create a new data object on the backup medium corresponding to a new version of the first backed up file;
add pointers to the new data object to reference the one or more data segments of the first backed up file; and
add a new entry to the backup catalog that identifies the new version of the first backed up file, wherein the new entry includes a pointer to the new data object;
after said conveying the one or more modification requests, convey from the second host to the first host, via the virtual file system interface, one or more modification requests to modify the first backed up file;
in response to the first host receiving the one or more modification requests:
store one or more new data segments on the backup medium; and
modify the new data object to reference the one or more new data segments, wherein said modifying the new data object includes one or more of: adding one or more new pointers to the new data object to reference the one or more new data segments; or removing one or more of the previously existing pointers from the new data object.

12. The computer readable medium as recited in claim 11, wherein the computer instructions are executable by the one or more processors to cause the first host to utilize a single-instance storage technique whereby data is de-duplicated to remove redundant copies on the backup medium.

13. The computer readable medium as recited in claim 11, wherein the instructions are further executable to create and store multiple versions of the backed up files on the backup medium through the virtual file system.

14. The computer readable medium as recited in claim 11, wherein the computer instructions are further executable by the one or more processors to:
- after said conveying the one or more modification requests, convey from the second host to the first host, via the virtual file system interface, a request to close the first file;
- in response to the first host receiving the request to close the first file, update one or more attributes stored in the new entry that was added to the backup catalog.

* * * * *